US012663367B2

(12) United States Patent
Keränen

(10) Patent No.: US 12,663,367 B2
(45) Date of Patent: Jun. 23, 2026

(54) LIGHTING ASSEMBLY AND METHOD FOR PROVIDING MEASURING LIGHT AND OPTICAL MEASURING DEVICE

(71) Applicant: LMI TECHNOLOGIES INC., Burnaby (CA)

(72) Inventor: Heimo Keränen, Oulu (FI)

(73) Assignee: LMI TECHNOLOGIES INC., Burnaby (CA)

( * ) Notice: Subject to any disclaimer, the term of this patent is extended or adjusted under 35 U.S.C. 154(b) by 178 days.

(21) Appl. No.: 18/555,717

(22) PCT Filed: Apr. 11, 2022

(86) PCT No.: PCT/FI2022/050233
§ 371 (c)(1),
(2) Date: Oct. 16, 2023

(87) PCT Pub. No.: WO2022/223876
PCT Pub. Date: Oct. 27, 2022

(65) Prior Publication Data
US 2024/0201076 A1      Jun. 20, 2024

(30) Foreign Application Priority Data
Apr. 19, 2021      (FI) ..................................... 20215460

(51) Int. Cl.
*G01N 21/31*          (2006.01)
*C09K 11/00*          (2006.01)
(Continued)

(52) U.S. Cl.
CPC .............. *G01N 21/31* (2013.01); *C09K 11/00* (2013.01); *F21V 13/08* (2013.01); *G01J 3/10* (2013.01);
(Continued)

(58) Field of Classification Search
CPC .. G01N 21/31; G01N 21/17; G01N 2201/061; G01N 2201/068; C09K 11/00;
(Continued)

(56) References Cited

U.S. PATENT DOCUMENTS 9,121,578 B2 *  9/2015  Morgenbrod ........... F21V 13/14
10,731,965 B1   8/2020  Schönleber
(Continued)

FOREIGN PATENT DOCUMENTS

CN          108779897 A      11/2018
CN          109307950 A       2/2019
(Continued)

OTHER PUBLICATIONS

International Search Report and Written Opinion for International Application No. PCT/FI2022/050233, mailed Jul. 18, 2022, 11 pages.
(Continued)

*Primary Examiner* — Michelle M Iacoletti
*Assistant Examiner* — Noah J. Haney
(74) *Attorney, Agent, or Firm* — Stoel Rives LLP

(57) ABSTRACT

Presented herein is a lighting assembly for providing polychromatic measuring light (230) for an optical measuring device. The lighting assembly comprises an aperture component (202) comprising a first and opposite second side and at least one orifice (204), at least one pump light source (206) located on the first side of the aperture component (202) to provide pump light (220). and photoluminescent component (208) located on the second side of the aperture component (202) for converting pump light (220) receivable onto the photoluminescent component (208) from the at least one pump light source (206) into polychromatic measuring light (230). At least part of the measuring light (230) is allowed to pass the aperture component (202) through the
(Continued)

at least one orifice (204) to provide measuring light (230) to the first side of the aperture component (202). A related method and a measuring devise using the lighting assembly are also presented.

15 Claims, 5 Drawing Sheets

(51) Int. Cl.

| | |
|---|---|
| *F21V 13/08* | (2006.01) |
| *G01B 11/00* | (2006.01) |
| *G01B 11/06* | (2006.01) |
| *G01J 3/10* | (2006.01) |
| *G01J 3/42* | (2006.01) |
| *G01J 3/46* | (2006.01) |
| *G01N 21/17* | (2006.01) |
| *G02B 5/00* | (2006.01) |
| *G02B 21/00* | (2006.01) |
| *G02B 27/40* | (2006.01) |
| *G03B 21/20* | (2006.01) |

(52) U.S. Cl.
CPC ................. *G01J 3/46* (2013.01); *G02B 5/00* (2013.01); *G02B 21/0024* (2013.01); *G02B 21/0032* (2013.01); *G03B 21/204* (2013.01); *G01B 11/00* (2013.01); *G01B 11/0608* (2013.01); *G01B 2210/50* (2013.01); *G01J 3/42* (2013.01); *G01J 2003/425* (2013.01); *G01N 21/17* (2013.01); *G01N 2201/061* (2013.01); *G01N 2201/068* (2013.01); *G02B 27/40* (2013.01)

(58) Field of Classification Search
CPC ..... F21V 13/08; G01J 3/10; G01J 3/46; G01J 3/42; G01J 2003/425; G02B 5/00; G02B 27/40; G02B 21/0024; G02B 21/0032; G03B 21/204; G01B 11/00; G01B 11/0608; G01B 2210/50

USPC ............................................. 356/326; 362/84
See application file for complete search history.

(56) References Cited

U.S. PATENT DOCUMENTS

| | | | | |
|---|---|---|---|---|
| 12,104,785 B2 * | 10/2024 | Van Bommel | ....... | H04N 9/3144 |
| 2009/0059359 A1 | 3/2009 | Nahm et al. | | |
| 2010/0097779 A1 | 4/2010 | Ding et al. | | |
| 2010/0202129 A1 * | 8/2010 | Abu-Ageel | ........ | C09K 11/7741 |
| | | | | 362/293 |
| 2013/0057833 A1 * | 3/2013 | Katou | .................. | G02B 26/008 |
| | | | | 362/228 |
| 2013/0094182 A1 | 4/2013 | Morgenbrod et al. | | |
| 2013/0155379 A1 | 6/2013 | Morgenbrod et al. | | |
| 2013/0250544 A1 * | 9/2013 | Zink | .................. | H10H 20/8514 |
| | | | | 359/326 |
| 2014/0022512 A1 | 1/2014 | Li et al. | | |
| 2018/0203119 A1 | 7/2018 | Kern et al. | | |
| 2018/0356208 A1 * | 12/2018 | Kuga | .................. | G02B 21/0076 |
| 2018/0363860 A1 * | 12/2018 | Kasugai | ................... | F21K 9/64 |
| 2019/0191133 A1 * | 6/2019 | Ostrow | ............... | H04N 9/3161 |
| 2020/0166197 A1 * | 5/2020 | Signoretto | ............. | F21V 29/87 |
| 2020/0173921 A1 | 6/2020 | Fujiwara et al. | | |
| 2024/0167808 A1 * | 5/2024 | Weiß | ..................... | G01B 11/06 |

FOREIGN PATENT DOCUMENTS

| | | | | |
|---|---|---|---|---|
| DE | 102016222047 A1 | 5/2018 | | |
| EP | 3321649 A1 | 5/2018 | | |
| WO | WO-2018001813 A1 * | 1/2018 | ............. | F21V 29/70 |

OTHER PUBLICATIONS

Office Action dated Aug. 12, 2025 for Finnish Patent Application No. 20215460; pp. 1-7.
Office Action dated Mar. 13, 2026 for Chinese Patent Application No. 202280029437.0; pp. 1-9,.

* cited by examiner

200

Second side | First side

200

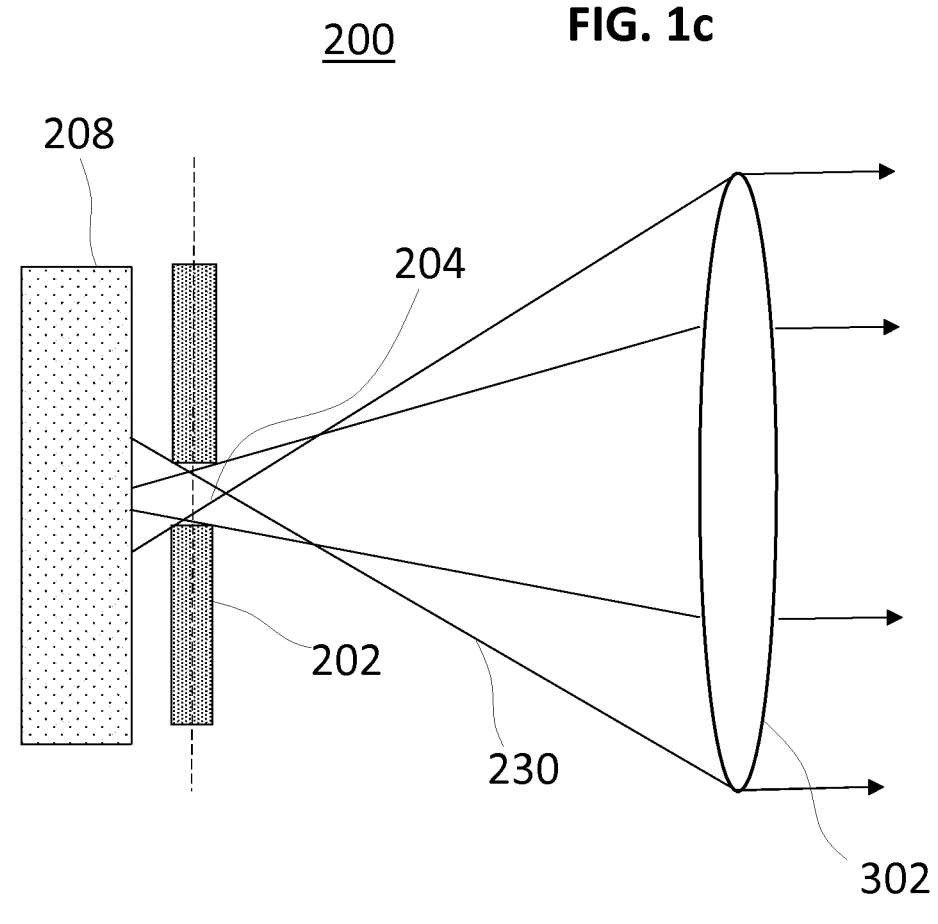
200    FIG. 1c
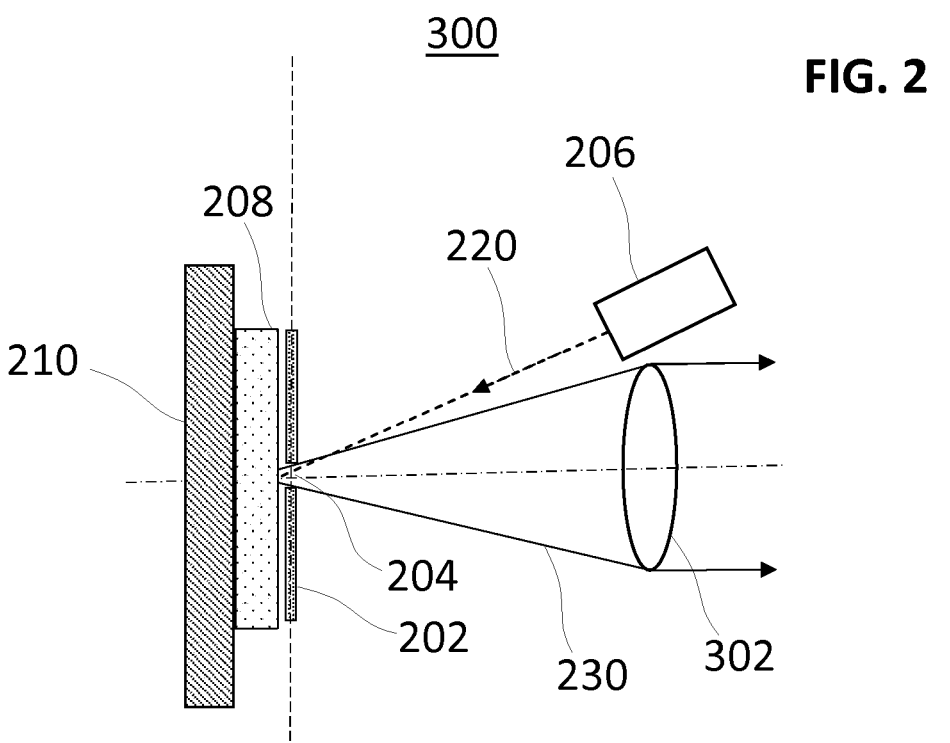
300    FIG. 2

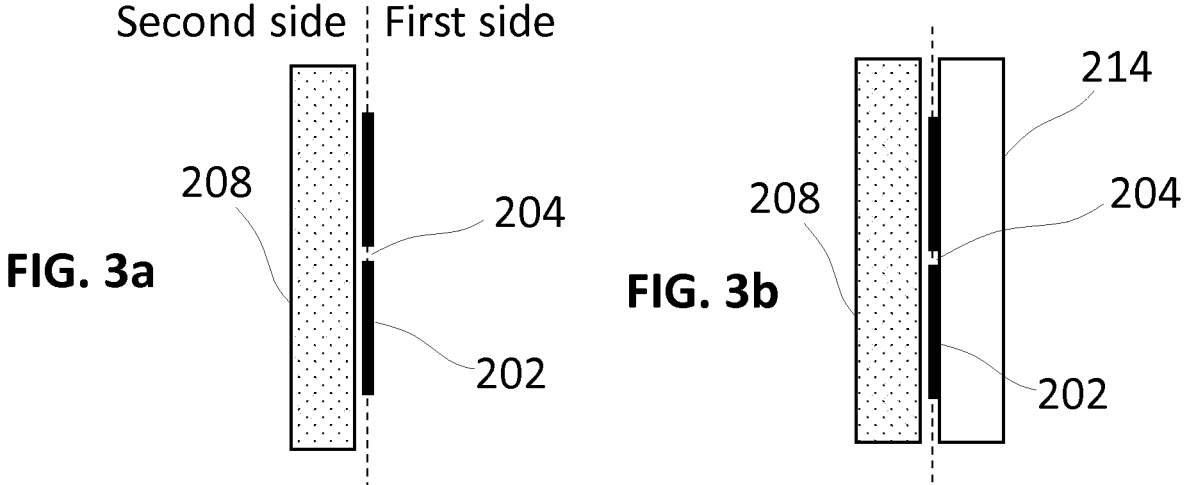
FIG. 3a
FIG. 3b
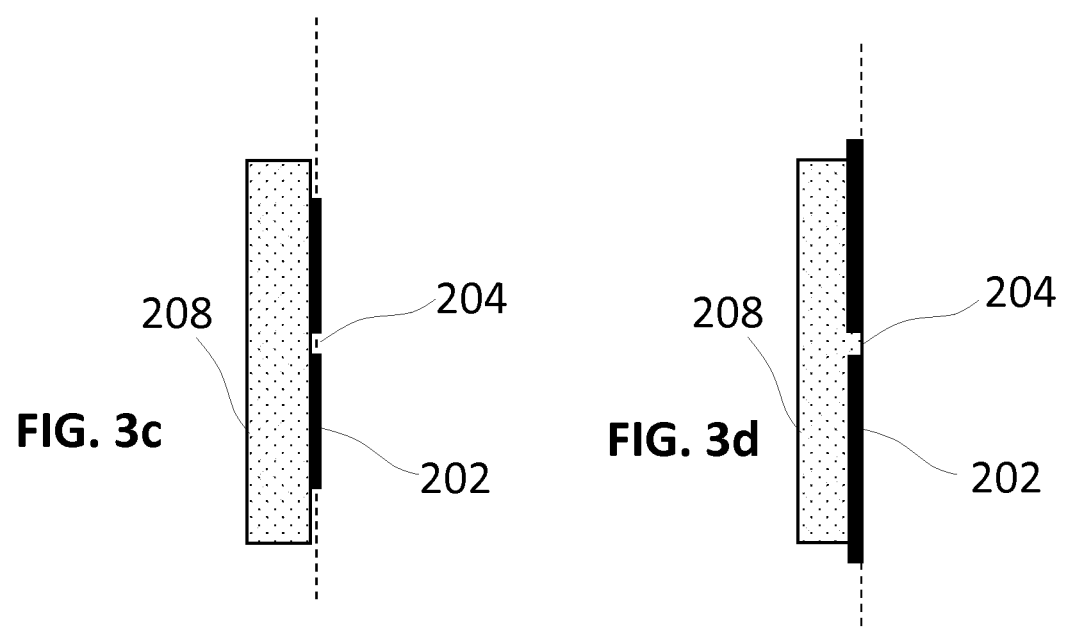
FIG. 3c
FIG. 3d

400

500

600

700

LIGHTING ASSEMBLY AND METHOD FOR PROVIDING MEASURING LIGHT AND OPTICAL MEASURING DEVICE

RELATED APPLICATIONS

This application is a national stage under 35 U.S.C. § 371 of International Application No. PCT/FI2022/050233, filed Apr. 11, 2022, which claims priority of Finland Patent Application No. 20215460, filed Apr. 19, 2021, each of which are hereby incorporated by reference in their entirety.

TECHNICAL FIELD

Generally, the present invention relates to optical measuring. More particularly, however not exclusively, the present invention relates a luminescence-based lighting assembly for providing measuring light. Furthermore, the present invention relates to a method for providing measuring light and an optical measuring device.

BACKGROUND

There exists a variety of designs of lighting arrangements for providing measuring light for optical measurement devices. For example, U.S. Pat. No. 10,731,965 discloses a luminescence-based light source utilised in a chromatic confocal measuring device, wherein the light source includes a luminophore whose oblong exit surface emits polychromatic measuring light when the luminophore being illuminated by pump light. However, there still exists a need for improving operational efficiency in providing luminescence-based measuring light.

SUMMARY

In accordance with the present invention, a lighting assembly and related method for providing measuring light and a measurement device utilising said measurement light, is provided in the independent claims. Some advantageous embodiments of the invention are inter alia disclosed in the dependent claims. An aspect of this application is to advance the art of illuminating and optical measuring systems.

It is another aspect of this application to provide in whole or in part, at least the advantages described herein.

There is provided a lighting assembly for providing measuring light for optical measuring device, that includes an aperture component comprising a first and opposite second side and at least one orifice, at least one pump light source to provide pump light, and a photoluminescent component. The photoluminescent component locates on the second side of the aperture component and is configured for converting pump light receivable onto the photoluminescent component from the at least one pump light source into polychromatic measuring light. At least part of the polychromatic measuring light is arranged to pass through the at least one orifice from the second side of the aperture component to provide measuring light to the first side of the aperture component. In this lighting assembly the pump light source locates on the first side of the aperture component.

There is provided a lighting assembly, where the pump light and the measuring light may be arranged to pass through the same the at least one orifice of the aperture component. The pump light may be arranged to pass through the orifice from the first side and the measuring light may be arranged to pass through the orifice from the second side of the aperture component, respectively.

There is provided a lighting assembly, where the material of the aperture component may be transparent for the pump light and nontransparent for the measuring light.

There is provided a lighting assembly, where the second side of the aperture component may be at least partially reflectable for the pump light and/or the measuring light.

There is provided a lighting assembly, where the lighting assembly may further comprise a substrate component attached to a side of the photoluminescent component opposite to another side of the photoluminescent component towards the second side of the aperture component.

There is provided a lighting assembly, where the aperture component, the photoluminescent component and the substrate component may be attached to each other forming a multilayer structure such that the photoluminescent component is at least partially sandwiched between the substrate component and the aperture component.

There is provided a lighting assembly, where the assembly may further comprise an optical connecting component disposed on the first side of the aperture component such that the pump light is inputtable and directable via the connecting component to the at least one orifice.

There is provided a lighting assembly, where the connecting component may be a beam splitter or dichroic filter, wherein the measuring light being allowed to pass through the connection component.

There is provided a lighting assembly, wherein the connection component may be a mirror or optical fiber.

There is provided a lighting assembly, where the at least one orifice may be a punctiform orifice.

There is provided a lighting assembly, where the at least one orifice may be a slit-shaped orifice.

There is provided a lighting assembly, where the aperture component may comprise a masking, preferably metal film, layer on the photoluminescent component, being preferably produced by deposition technology.

There is provided a lighting assembly, where the lighting assembly may further comprise an optically transmissive substrate located on the first side of the aperture component, wherein the aperture component comprises a masking, preferably metal film, layer on a side of the transmissive substrate towards the luminescent component. The masking is preferably produced by deposition technology.

There is provided an optical measuring device for determining an object being measured, the optical measuring device comprises the lighting assembly according to the present invention.

There is provided an optical measuring device, where the optical measuring device may comprise imaging optics, wherein the at least one pump light source and the connecting component of the lighting assembly and the imaging optics of the measuring device are disposed in relation to the at least one orifice of the lighting assembly such that the pump light provided from the pump light source is inputtable and directable via the connection component through the imaging optics, and hence is focusable through the imaging optics to the at least one orifice, and that the measuring light passed through the at least one orifice is collectable by the imaging optics.

There is provided an optical measuring device, that may be a chromatic confocal measuring device for determining of one or more properties of a surface of the object. The property being determined may be distance; height or position; refraction index; a thickness; reflectance or roughness, for example.

There is provided an optical measuring device, that may be a spectroscopic measuring device for determining transmission or reflectance spectrum of the object or the colour of the surface of the object.

There is also provided a method for providing measuring light that includes at least directing pump light from at least one pump light source through at least one orifice of an aperture component onto a photoluminescent component locating on the second side of the aperture component, converting part of the pump light in the luminescent component into polychromatic measuring light, and providing measuring light to the first side of the aperture component by allowing part of the measuring light pass the aperture component through the at least one orifice.

In this document by a photoluminescent component is meant a piece of material, e.g., a plate, layer, slab or coating, including or consisting either of a single crystal or of pressed, sputtered or sprayed powder of at least one of fluorescent, phosphorescent and luminophore substances. The photoluminescent component is designed to receive electromagnetic radiation such as pump light of certain wavelength(s) and is capable of converting the pump light absorbed into the photoluminescent component into a broader band of wavelengths of light (i.e., polychromatic light) in phosphorescence and/or fluorescence process.

The present invention offers advantages over the known prior art, such as it may allow to focus pump light precisely to cover an orifice of the aperture component and hence the area of the luminescent component behind the orifice, which may provide as high intense measuring light as possible with the pump light directed to the aperture component.

Another advantage of the invention is that it may allow to modify spatial intensity distribution of measuring light provided through an orifice of the aperture component.

Still another advantage of the invention is that it may allow to provide pump light with high efficiency and high radiance since pump light can be directed at the luminescent component and creating a tightly focused and homogenous illumination area on a surface of the luminescent component that corresponds essentially the form and area of the orifice through which the measuring light is allowed to pass.

Still another advantage of the invention is that it may allow defining and providing the measuring light essentially in a form or shape of the orifice.

Still another advantage of the invention is that it may allow configuring the lighting assembly with lower number and/or complexity of the components than it is required with the conventional lighting assemblies or luminophore/luminescent light sources to provide said measuring light.

Still another advantage of the invention is that the cooling of the luminescent component may be implemented more effectively and the luminescent component may require less cooling than in the conventional lighting assemblies or luminophore/luminescent light sources utilising transmission luminescence for providing measuring light.

Still another advantage of the invention is that imaging optics of the measuring device using can be used for collecting and focusing the pump light to the luminescent component and for collecting the measuring light passed through the at least orifice.

The expression "a number of" may herein refer to any positive integer starting from one (1).

The expression "a plurality of" may refer to any positive integer starting from two (2), respectively.

The terms "first" and "second" are herein used to distinguish one element from the other element, and not to specially prioritize or order them, if not otherwise explicitly stated.

The previously presented considerations concerning the various aspects of the lighting assembly may be flexibly applied to the aspects of the method mutatis mutandis, and vice versa, as being appreciated by a skilled person.

The embodiments in the following detailed description are given as examples only and someone skilled in the art can carry out the basic idea of the invention also in some other way than what is described in the description. Most embodiments can be actualised in a variety of combinations with other embodiments. Though the description may refer to a certain embodiment or embodiments in several places, this does not imply that the reference is directed towards only one described embodiment or that the described characteristic is usable only in one described embodiment. The individual characteristics of a plurality of embodiments may be combined and new embodiments of the invention may thus be provided.

BRIEF DESCRIPTION OF THE DRAWINGS

The foregoing and other objects, features, and further advantages of the invention will be apparent from the following more particular description of the embodiments of the invention, as illustrated in the accompanying drawings (the elements of the drawings are not necessarily to scale relative to each other), in which:

FIGS. 1a-1c illustrates one embodiment of a lighting assembly in accordance with the present invention, wherein FIG. 1a illustrates general concepts of the assembly, FIG. 1b illustrates a concept of directing of pump light through at least one orifice of the aperture component to the luminescent component, and FIG. 1c illustrates a concept of providing of measuring light through the at least one orifice of the aperture component;

FIG. 2 illustrates a variation of the lighting assembly in accordance with the present invention;

FIGS. 3a-3d illustrates embodiments of the aperture component;

DETAILED DESCRIPTION

Figure 1A:
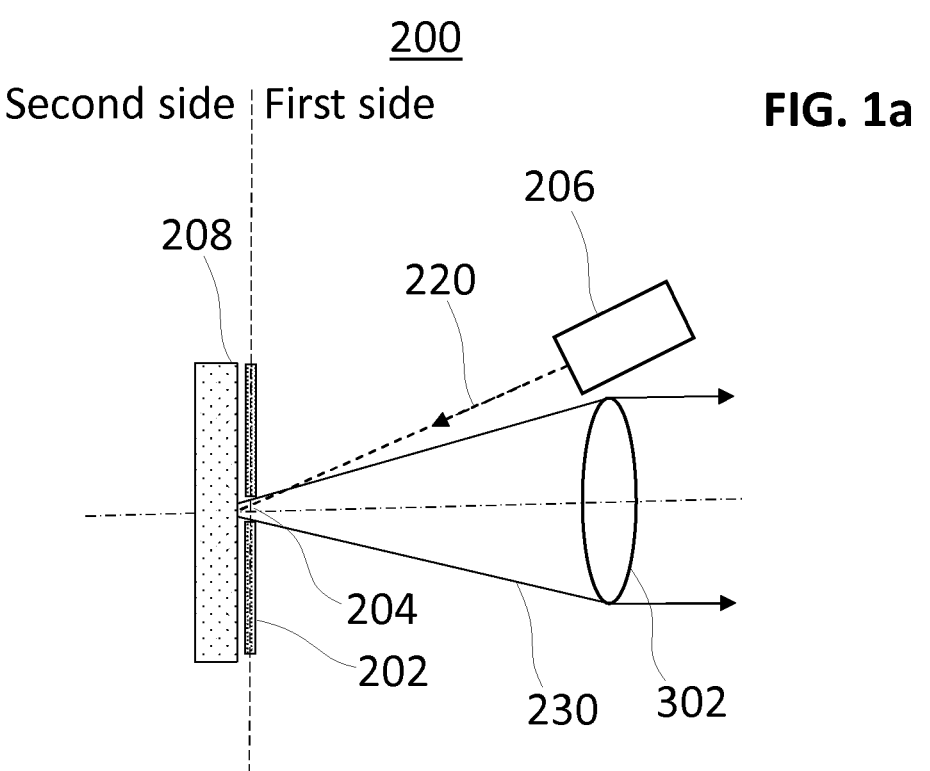

In respective figures, the same or corresponding parts are denoted by the same reference numerals, and in most cases duplicate textual description will be omitted as well.

Figure 1B:
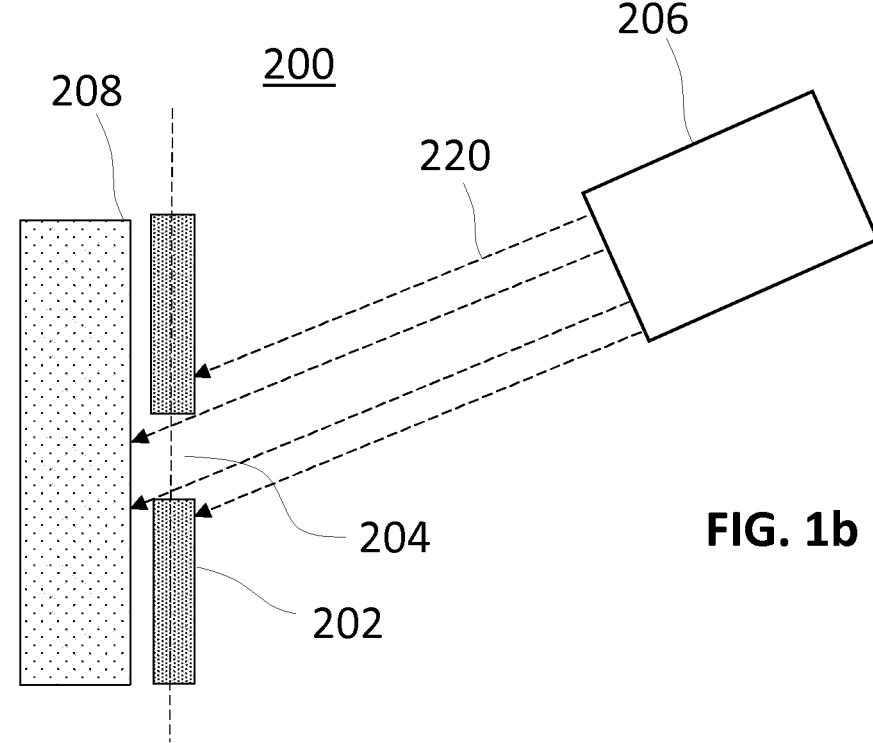

FIGS. 1a-1c illustrate, by means of a schematic side views, many general concepts of various embodiments of the present invention via one, merely exemplary, realisation of a lighting assembly at 200 for providing measuring light according to the present invention.

In FIGS. 1a and 1c and FIGS. 4a-4c it is also shown illuminating or imaging optics 302 that does not belong to the depicted embodiments of the lighting assembly but can be incorporated into a measuring device using measuring light provided by the lighting assembly according to the embodiments. The imaging optics 302 can include a number of lenses and/or other optical components.

FIG. 1a shows that the assembly 200 includes an aperture component 202 comprising at least one orifice 204 and a first and opposite second side, a photoluminescent component

208, and at least one pump light source 206 located on the first side of the aperture component 202. One side of the photoluminescent component 208 is towards the second side of the aperture component 202. The pump light source 206 is configured to emit pump light 220 and is disposed with respect to the first side of the aperture component 202 such that the pump light 220 can be directed from the pump light source 206 to the luminescent component 208 such that the pump light 220 passes through the orifice 204 of the aperture component 204. In other words, the pump light 220 is allowed to enter the luminescent component 208 through the at least orifice 204 of the aperture component 202.

When the pump light 220 that comprises a first wavelength enters the luminescent component 208, the luminescent component 208 converts the pump light (or at least part of it) into polychromatic light measuring light 230. The polychromatic measuring light 230 can comprise a spectrum of wavelengths, which are typically greater than the wavelength of the pump light 220. Part of the polychromatic measuring light 230 passes through the at least one orifice 204 to the first side of the aperture component 204. The pump light source 206 and the imaging optics 302 of the measuring device utilising the measuring light 230 provided to the first side of the aperture component 202 can be disposed with respect to the at least one orifice 204 such that the measuring light 230 passed through the at least one orifice 204 is collectable by the imaging optics 302, as shown in the figure. The collected measuring light 230 can be further focusable by the imaging optics 302 or other optics of the measuring device onto an object being illuminated (not shown in the figure).

The pump light source 206 can comprise a laser or an LED configured for providing pump light characterised in wavelength that causes a desired conversion of the pump light 220 (by e.g., phosphorescence or fluorescence process, depending on the embodiment) into the measuring light 230 in the photoluminescent component 208. The pump light is typically nearly monochromatic.

The pump light 220 and the measuring light 230 can be arranged to pass through the same the at least one orifice 204 of the aperture component 202, the pump light from the first side and the measuring light from the second side of the aperture component, respectively.

The lighting assembly can comprise a plurality of pump light sources 206. For instance, in cases where the aperture component 202 comprises a plurality of orifices 204 there can be a plurality of pump light sources 206 to direct pump light 220 to the luminescent component 208 through the plurality of orifices 204, and therefore, to provide measuring light 230 from the plurality of orifices 204.

In one embodiment, a plurality of pump light sources 206 is arranged to illuminate pump light 220 through the same at least one slit-shaped orifice 204 or a group of point-formed orifice 204 to increase luminous energy and/or radiant energy per unit are on the luminescent component 208 behind the orifice 204, and hence, intensity and/or radiance of the pump light 230 passed through the corresponding orifice 204.

In one embodiment, a first number of pump light sources 208 is configured to direct pump light 220 to a first number of orifices 204 and a second or further number of pump light sources 208 is configured to direct pump light 220 to a second or further number of orifices 204, respectively. In this embodiment, the orifice through which converted measuring light 230 is provided, and hence, the position wherefrom the aperture component 202 the measuring light 230 is provided can be modulated by modulating the pump light sources being configured to direct the pump light to the different orifices 208.

The orifice 204 can be a punctiform orifice or slit-shaped orifice. In this context by the slit-shaped orifice is meant a long, narrow cut or opening that can be formed into a straight or curved shape in the aperture component 202.

Practically, the orifice 204 is configured to define and give the measuring light 230 passed through the orifice 204 essentially in a form or shape of the orifice 204.

The slit-shaped orifice 204 can be e.g., 10 μm wide and 10 mm long opening in the aperture component. A person skilled in the art shall appreciate the fact that such dimensions of the orifice 204 can indeed vary embodiment-specifically.

In some embodiments, the aperture component 202 can comprise a plurality of punctiform orifices and/or slit-shaped orifices. The punctiform orifices can be arranged into a line or other formation.

FIG. 1*b* illustrates the directing of pump light 220 from the pump light source 206 of the lighting assembly 200 (for reasons of the clarity measuring light 220 is not shown in the figure). In FIG. 1*b* it is shown that an illumination area or spot of the pump light 220 from an individual pump light source 206 covers at least the shape of the orifice 204. Therefore, the pump light source 206 can comprise optics and/or the pump light source 206 can be disposed such that the pump light source 206 can create a tightly focused and homogenous illumination spot of the pump light 220 which covers the whole area of the orifice 204. However, in order to increase efficiency of the lighting, it is advantageous to create this illumination spot in a such way that a very minor part of the pump light 220 hits the surface of the aperture component 202 and a most part of the pump light 220 enters directly the luminescent component 208 through the orifice.

When the pump light 220 from at least one pump light source 206 is directed to the aperture component 202 and the at least one orifice 204 therein, part of the pump light 220 may reflect from the edges of the at least one orifice 204 or from a surface of the first side of the aperture component 208. However, a person skilled in the art shall appreciate the fact that such reflected pump light 220 can be removed e.g., by filtering means to prevent entering of the reflected pump light 220 to an object being illuminated by the measuring light 230.

FIG. 1*c* illustrates the passing of the measuring light 230 through the orifice 204 (for reasons of the clarity the pump light source 204 is not shown in the figure). In the figure there is a gap between the aperture component 202 and the luminescent component 208 just to show that the imaging optics 302 of the measuring device utilising the measuring light 230 collects the measuring light 230 through the orifice 204 from larger area of the fluorescent material 208 behind the orifice 204 than the area of the orifice 204. Therefore, in order to increase efficiency of the lighting assembly, it is advantageous to dispose the luminescent component 208 directly contact with aperture component 202 and form the aperture component 204 as thin as possible.

Since the orifice 204 can be placed very close to the photoluminescent component 208 and to the at least one orifice 204 therein, the orifice 204 defines essentially the shape of the emitting area of the measuring light 230, which practically corresponds to the shape of the orifice 204. This allows to maximise efficiency of the assembly and intensity of measuring light 230 provided through the orifice 204.

FIG. 2 shows at 300 a variation of the lighting assembly that differs from the embodiment 200 of FIGS. 1*a-c* in that it includes a substrate component 210 attached to a side of the photoluminescent component 208 opposite to another side of the photoluminescent component 208 towards the orifice 204 and the second side of the aperture component 202.

The substrate component 210 can support the photoluminescent component 208. It 210 can be e.g., a metal, such as copper, substrate, and enables a positioning of the photoluminescent component 208 and its efficient cooling when illuminated (i.e. irradiated) by the pump light 220.

The aperture component 202, the photoluminescent component 208 and the substrate component 210 can be connected each other such that the photoluminescent component 208 is at least partially sandwiched between the substrate component, as shown in FIG. 2.

FIG. 3a-3d illustrate embodiments of the aperture component 202.

In FIG. 3a is shown an aperture component 202 that can be a piece, preferably thin layer or film, of nontransparent material such as metal comprising at least one orifice 204. As motivated hereinabove, the aperture component 202 is advantageously attached directly on the surface of the luminescent component 208. The aperture component 202 can be attached to the luminescent component 208 such that there is an adhesive layer or the like between the aperture component 202 and the luminescent component 208.

FIG. 3b illustrates a further embodiment of the aperture component 202. The shown design incorporates an optically transmissive substrate 214. In this design the transmissive substrate 214 is a layer that is transmissive for the pump light 220 and the measuring light 230 as well, wherein the aperture component is a masking, preferably a thin film of metal or other material, layer on a side of the transmissive substrate 214 towards the luminescent component 208, as shown in FIG. 3b. The masking layer comprising at least one orifice 204 can be formed directly on the surface of the transmissive substrate 214 by deposition process, for example. This design allows forming of the aperture component 202 (i.e., the masking layer) and the at least one orifice 204 thereon can be formed very thin.

Alternatively, the aperture component 202 can be formed on other side of the substrate 214 opposite the side towards the luminescent component 208. However, this is not preferred since there is in this case the substrate 214 between the aperture component 202 and the luminescent component 208 which reduces efficiency of the illumination of the pump light 220 per unit area on the luminescent component 208 and intensity of the measuring light 230 provided through the orifice 204.

FIG. 3c illustrates a further embodiment of the aperture component 202. In this design the aperture component 202 comprises a masking, preferably metal or other material, layer that is formed e.g., by deposition process directly on the surface of the photoluminescent component 208. This design has the advantage that the aperture component 202 (i.e., the masking) and the at least one orifice 204 therein can be formed very thin and essentially to the level of the surface of the photoluminescent component 208.

FIG. 3d illustrates a further embodiment of the aperture component 202. In this design the luminescent component 208 extends to and fill the orifice 204 of the aperture component 204. The luminescent component 208 and the first surface of the aperture component are hence essentially at the same level, i.e., the thickness of the aperture component is practically nil. This design can be manufactured by compressing the powder material of the luminescent component 208 to the orifice 204 or machining either the luminescent component 208 or aperture component 202 or both, for example.

In a further embodiment, the material of the aperture component 202 is configured to be transparent for the pump light 220 and nontransparent for the measuring light 230. This design allows using essentially all pump light 220 for illuminating the luminescent component 208 and hence increasing the light conversion efficiency into measuring light 230 and its intensity.

In a further embodiment, the second side of the aperture component 202 is configured to be at least partially reflectable for the pump light 220 and/or the measuring light 230.

Figure 4A:
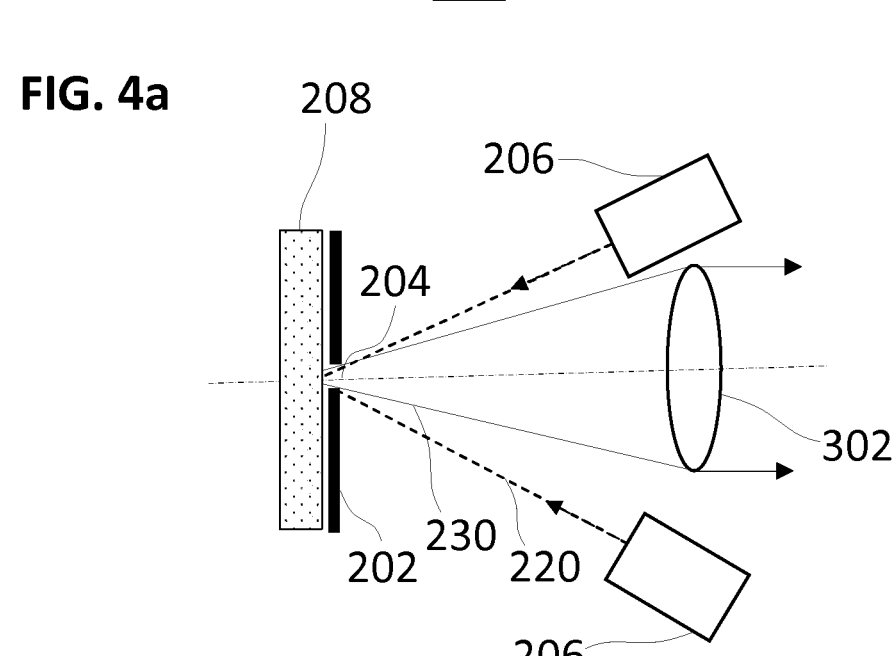
FIGS. 4a-4c illustrate further variations of the lighting assembly in accordance with the present invention.
Figure 4B:
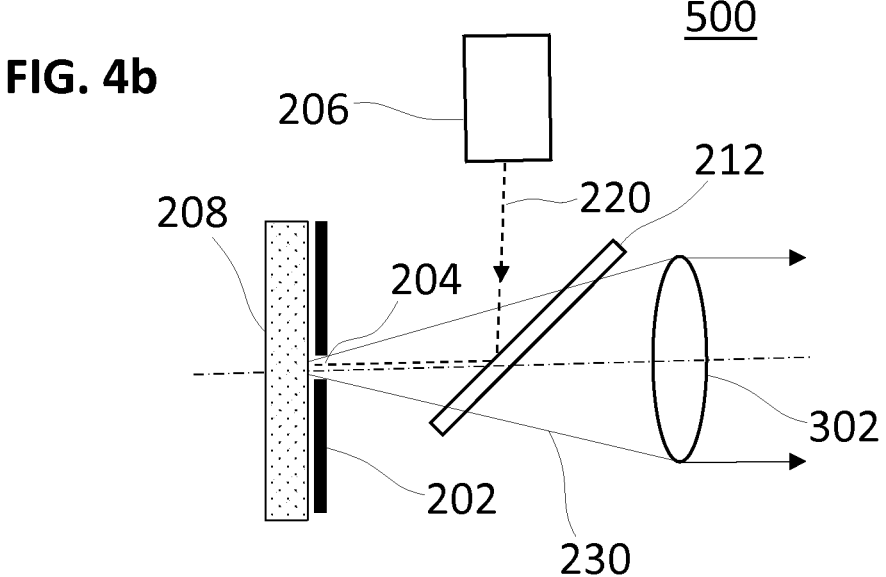
Figure 4C:
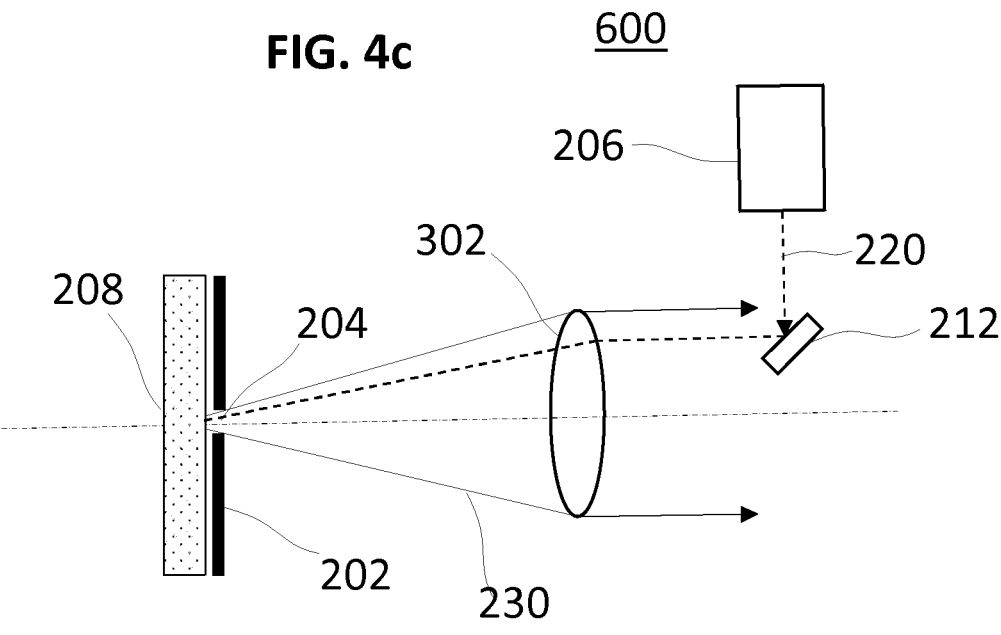

FIG. 4a-4c illustrate further variations of the lighting assembly.

In FIG. 4a is shown a lighting assembly 400 that comprises a plurality of pump light sources 206. The pump light sources 206 can be disposed such that pump light 220 is directed from different locations and angles to the orifice 204, as shown in the figure. By irradiating the photoluminescent component 208 by the plurality of pump light sources 206 it is possible to further increase pump light 220 per unit area on the luminescent component, and hence, increase light conversion from the pump light 220 into measuring light 230 and intensity of measuring light 230.

FIG. 4b shows a lighting assembly 500 that differs from the lighting assembly 200 in that it further includes an optical connecting component 212. The connecting component 212 is disposed on the first side of the aperture component 202 such that the pump light 220 from the pump light source 206 is inputtable and directable via the connecting component 212 to the at least one orifice 204.

The connecting component 212 can be a beam splitter or dichroic filter disposed on the first side of the aperture component 202 such that the pump light 220 from a pump light source 206 is reflectable from (i.e., via) the beam splitter 212 to the orifice 204 being further entered the photoluminescent component 208 behind the aperture component 202 and that the measuring light 230 emitted from the luminescent component 208 is transmissible through the connecting component 212.

Alternatively, the connecting component 212 can be a mirror or optical fiber disposed such that it 212 does not block propagating of the measuring light 230.

FIG. 4c shows a lighting assembly 600 that differs from assembly 500 in that the pump light source 208 and the optical connecting component 208 are configured to provide the pump light 220 inside the measuring device utilising measuring light. In this design the pump light source 206, the connecting component 212 and the imaging optics 302 are disposed in relation to the at least one orifice 204 such that the pump light 220 from the pump light source 206 is inputtable and directable via the connection component 212 and further through the imaging optics 302, wherein the imaging optics is configured to focus the pump light 220 through the imaging optics 302 to the at least one orifice 204, and wherein the measuring light 230 passed through the at least one orifice 204 is collectable by the imaging optics 302. In this design there is not necessarily need to incorporate optics to the pump light source 206. However, in the cases where there are optics incorporated in the pump light source 206 an illumination spot of the pump light 220 can be formed by a combination of the imaging optics 302 and the optics of the pump light source 206.

In the design of FIG. 4c the imaging optics 302 of the measuring device can be used for collecting and focusing the pump light 220 from the at least one pump source 206 to the luminescent component 208 and for collecting the measuring light 230 passed through the at least orifice 204 which can be further be focusable via the imaging optics onto an object being illuminated. This is a clear advantage which cannot be actualised with the conventional lighting assembly where the pump light and the measuring light are not allowed to pass through the same orifice.

As described hereinabove the lighting assembly according to the present invention can be incorporated into an optical measuring device for providing measuring light 230 for the optical measuring device.

Generally, the lighting assembly according to the present invention and disclosure can utilise reflection luminescence in the conversion of pump light 220 into measuring light 230 in the luminescent component 208 for providing measuring light 230.

The lighting assembly according to the present invention can be incorporated into an optical measuring device selected from the group consisting of: a hyperspectral camera or scanner, pushbroom hyper or multi spectral scanner, spectrometer, or chromatic confocal measuring device, for providing measuring light 230.

Generally, the lighting assembly according to the present invention can be incorporated into an optical measuring device that utilises polychromatic measuring light passed through at least one orifice or slit to characterise an object being illuminated by such light.

The lighting assembly according to the present invention can be incorporated into a chromatic confocal measuring device such as disclosed e.g., in patent publications EP2076733 or U.S. Pat. No. 8,786,836.

Figure 5:
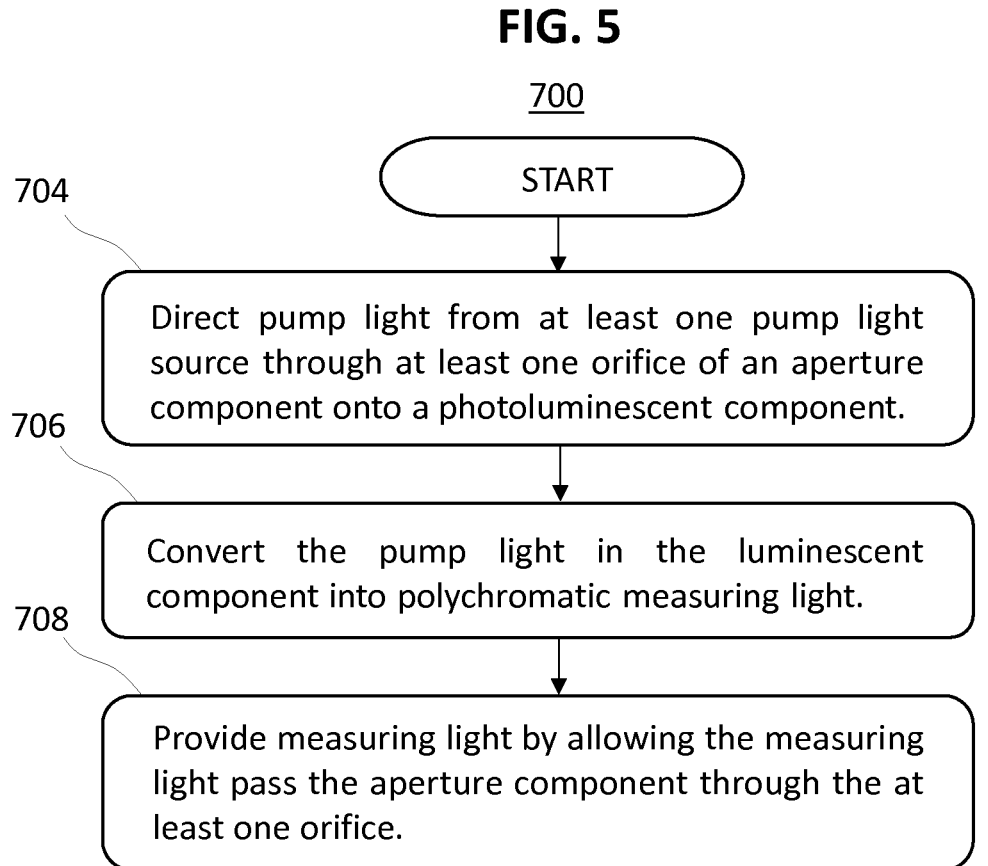
FIG. 5 is a flow diagram disclosing an embodiment of a method in accordance with the present invention.

FIG. 5 includes a flow diagram 700 disclosing an embodiment of a method in accordance with the present invention. The method comprises the following actions:

action 704: directing pump light 220 from at least one pump light source 206 through at least one orifice 204 of an aperture component 202 onto a photoluminescent component 208 locating on the second side of the aperture component 202, the pump light 220 being directed from a first side to a second side of the aperture component 202;

action 706: converting the pump light 220 in the luminescent component (208) into polychromatic measuring light 230; and action 708: providing measuring light 230 to the first side of the aperture component 202 by allowing the measuring light 230 pass the aperture component 202 through the at least one orifice 204.

In a method according to an embodiment, the pump light 220 and the measuring light 230 can be arranged to pass through the same the at least one orifice 204 of the aperture component 202.

In a method according to an embodiment, the material of the aperture component 202 can be transparent for the pump light 220 and nontransparent for the measuring light 230.

In a method according to an embodiment, the second side of the aperture component 202 can be at least partially reflectable for the pump light 220 and/or the measuring light 230.

In a method according to an embodiment, the lighting assembly can further comprise a substrate component 210 attached to a side of the photoluminescent component 208 opposite to another side of the photoluminescent component 208 towards the second side of the aperture component 202.

In a method according to an embodiment, the aperture component 202, the photoluminescent component 208 and the substrate component 210 can be attached to each other forming a multilayer structure such that the photoluminescent component 208 is at least partially sandwiched between the substrate component 210 and the aperture component 202.

In a method according to an embodiment, the assembly can further comprise a connecting component 212 disposed on the first side of the aperture component such that the pump light 220 is inputtable via the connecting component to the at least one orifice 204.

In a method according to an embodiment, the connecting component 212 can be a beam splitter or dichroic filter, wherein the measuring light 230 being allowed to pass through the connection component 212.

In a method according to an embodiment, the connection component 212 can be a mirror or optical fiber.

In a method according to an embodiment, the at least one orifice 204 can be a punctiform orifice.

In a method according to an embodiment, the at least one orifice 204 is a slit-shaped orifice.

In a method according to an embodiment, the aperture component 202 can comprise a masking, preferably metal film, layer on the photoluminescent component 202, being preferably produced by deposition technology.

In a method according to an embodiment, the lighting assembly can further comprise an optically transmissive substrate 214 located on the first side of the aperture component 202, wherein the aperture component comprises a masking, preferably metal film, layer on a side of the transmissive substrate 214 towards the luminescent component 208. The masking is preferably produced by deposition technology.

The invention has been explained above with reference to the aforementioned embodiments, and several advantages of the invention have been demonstrated. It is clear that the invention is not only restricted to these embodiments but the inventive idea can be applied in numerous ways within the scope of the claims.

The features recited in various embodiments hereinabove and dependent claims are mutually freely combinable unless otherwise explicitly stated.

The invention claimed is:

1. A chromatic confocal measuring device for determining one or more properties of a surface of an object, the chromatic confocal measuring device comprising a lighting assembly, which comprises:

an aperture component comprising a first and opposite second side, the aperture component defining at least one orifice;

at least one pump light source to provide pump light; and a photoluminescent component located on the second side of the aperture component for converting pump light receivable from the first side of the aperture component through the at least one orifice to the second side of the aperture component onto the photoluminescent component from the at least one pump light source into polychromatic measuring light, wherein part of the polychromatic measuring light is allowed to pass the aperture component through the at least one orifice to provide measuring light to the first side of the aperture component, wherein the pump light source being located on the first side of the aperture component;

wherein the at least one orifice comprises a slit-shaped orifice or a plurality of punctiform orifices.

2. The chromatic confocal measuring device of claim 1, wherein the pump light and the measuring light are allowed to pass through the same at least one orifice of the aperture component.

3. The chromatic confocal measuring device of claim 1, wherein the material of the aperture component is transparent for the pump light and nontransparent for the measuring light.

4. The chromatic confocal measuring device of claim 1, wherein the second side of the aperture component is at least partially reflectable for the pump light and/or the measuring light.

5. The chromatic confocal measuring device of claim 1, wherein the lighting assembly further comprises a substrate component attached to a side of the photoluminescent component opposite to another side of the photoluminescent component towards the second side of the aperture component.

6. The chromatic confocal measuring device of claim 5, wherein the aperture component, the photoluminescent component and the substrate component are attached to each other forming a multilayer structure such that the photoluminescent component is at least partially sandwiched between the substrate component and the aperture component.

7. The chromatic confocal measuring device of claim 1, wherein the lighting assembly further comprises an optical connecting component disposed on the first side of the aperture component such that the pump light is inputtable via the optical connecting component to the at least one orifice.

8. The chromatic confocal measuring device of claim 7, wherein the optical connecting component is a beam splitter or dichroic filter, wherein the measuring light is allowed to pass through the optical connecting component.

9. The chromatic confocal measuring device of claim 7, wherein the optical connecting component is a mirror or optical fiber.

10. The chromatic confocal measuring device of claim 1, wherein the aperture component comprises a masking layer on the photoluminescent component.

11. The chromatic confocal measuring device of claim 10 wherein the masking layer is a masking metal film layer produced by deposition.

12. The chromatic confocal measuring device of claim 1, the lighting assembly further comprises an optically transmissive substrate located on the first side of the aperture component, wherein the aperture component comprises a masking layer on a side of the transmissive substrate towards the photoluminescent component.

13. The chromatic confocal measuring device of claim 12 wherein the masking layer comprises a masking metal film layer produced by deposition.

14. The chromatic confocal measuring device of claim 1, wherein:
- the chromatic confocal measuring device comprises imaging optics;
- the pump light source, a connecting component and the imaging optics are disposed in relation to the at least one orifice such that the pump light is inputtable via the connection component through the imaging optics and is focusable through the imaging optics to the at least one orifice and such that the measuring light passed through the at least one orifice is collectable by the imaging optics.

15. A method for providing measuring light for a chromatic confocal measuring device for determining of one or more properties of a surface of an object, comprising:
- directing pump light from at least one pump light source through at least one orifice onto a photoluminescent component located on a second side of an aperture component, the pump light being directed from a first side to the second side of the aperture component;
- converting the pump light in the photoluminescent component into polychromatic measuring light; and
- providing measuring light to the first side of the aperture component by allowing the measuring light pass the aperture component through said at least one orifice;
- wherein the at least one orifice comprises a slit-shaped orifice or a plurality of punctiform orifices.

* * * * *